US012608462B1

(12) United States Patent
Furr et al.

(10) Patent No.: US 12,608,462 B1
(45) Date of Patent: Apr. 21, 2026

(54) ADAPTIVE AUTO-GENERATION OF USER PORTAL DISPLAYS IN RESPONSE TO USER PERMISSION ALTERATION

(71) Applicant: Bank of America Corporation, Charlotte, NC (US)

(72) Inventors: Hannah Furr, Charlotte, NC (US); Amy M. McNeil, Charlotte, NC (US); Quentin Petty, Charlotte, NC (US); Reginald R. Hayes, Charlotte, NC (US); Richard E. Dillahunt, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 39 days.

(21) Appl. No.: 18/958,208

(22) Filed: Nov. 25, 2024

(51) Int. Cl.
G06F 21/45 (2013.01)

(52) U.S. Cl.
CPC .................................... G06F 21/45 (2013.01)

(58) Field of Classification Search
CPC ....................................................... G06F 21/45
See application file for complete search history.

(56) References Cited

U.S. PATENT DOCUMENTS

| | | | | | |
|---|---|---|---|---|---|
| 8,327,419 | B1* | 12/2012 | Korablev | .............. | H04L 63/105 726/19 |
| 12,189,716 | B1* | 1/2025 | Liao | ...................... | G06F 18/217 |
| 2003/0107591 | A1* | 6/2003 | Jameson | ................. | G06F 9/451 715/744 |
| 2019/0239076 | A1* | 8/2019 | Chauhan | ................. | H04L 67/34 |

* cited by examiner

*Primary Examiner* — Amie C. Lin
(74) *Attorney, Agent, or Firm* — Weiss & Arons LLP

(57) ABSTRACT

Methods for adaptively autogenerating a set of requests and pushing an output to a user portal is provided. Methods may include obtaining requests executed on a digital platform from a plurality of user portals and tagging each request with a user access level. Methods may include in response to the determining of a change from a first access level of a user to a second access level, generating a set of requests associated with the second user access level. Methods may include generating a subset of requests that include a request frequency that exceeds a predetermined request frequency and a timestamp being within a predetermined time range. Methods may include re-executing the requests at predetermined intervals and storing an output in a temporary cache. In response to a login at the user portal, automatically pushing, via an API, the output in the temporary cache to the user portal.

20 Claims, 7 Drawing Sheets

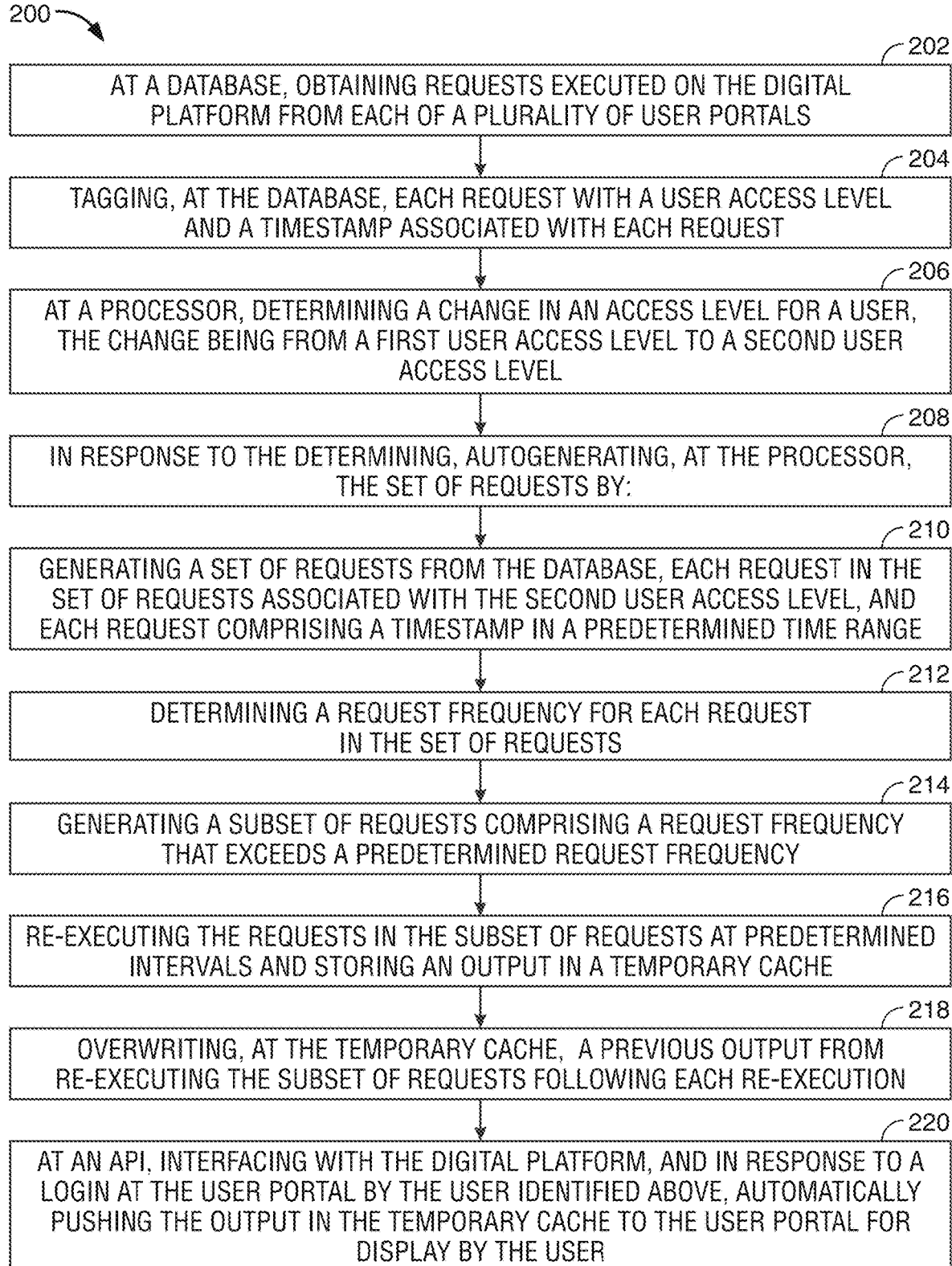

200

202
AT A DATABASE, OBTAINING REQUESTS EXECUTED ON THE DIGITAL
PLATFORM FROM EACH OF A PLURALITY OF USER PORTALS

204
TAGGING, AT THE DATABASE, EACH REQUEST WITH A USER ACCESS LEVEL
AND A TIMESTAMP ASSOCIATED WITH EACH REQUEST

206
AT A PROCESSOR, DETERMINING A CHANGE IN AN ACCESS LEVEL FOR A USER,
THE CHANGE BEING FROM A FIRST USER ACCESS LEVEL TO A SECOND USER
ACCESS LEVEL

208
IN RESPONSE TO THE DETERMINING, AUTOGENERATING, AT THE PROCESSOR,
THE SET OF REQUESTS BY:

210
GENERATING A SET OF REQUESTS FROM THE DATABASE, EACH REQUEST IN THE
SET OF REQUESTS ASSOCIATED WITH THE SECOND USER ACCESS LEVEL, AND
EACH REQUEST COMPRISING A TIMESTAMP IN A PREDETERMINED TIME RANGE

212
DETERMINING A REQUEST FREQUENCY FOR EACH REQUEST
IN THE SET OF REQUESTS

214
GENERATING A SUBSET OF REQUESTS COMPRISING A REQUEST FREQUENCY
THAT EXCEEDS A PREDETERMINED REQUEST FREQUENCY

216
RE-EXECUTING THE REQUESTS IN THE SUBSET OF REQUESTS AT PREDETERMINED
INTERVALS AND STORING AN OUTPUT IN A TEMPORARY CACHE

218
OVERWRITING, AT THE TEMPORARY CACHE,  A PREVIOUS OUTPUT FROM
RE-EXECUTING THE SUBSET OF REQUESTS FOLLOWING EACH RE-EXECUTION

220
AT AN API, INTERFACING WITH THE DIGITAL PLATFORM, AND IN RESPONSE TO A
LOGIN AT THE USER PORTAL BY THE USER IDENTIFIED ABOVE, AUTOMATICALLY
PUSHING THE OUTPUT IN THE TEMPORARY CACHE TO THE USER PORTAL FOR
DISPLAY BY THE USER

ACCESS LEVEL 1 302

304          306

USER A      USER B

308 ACCESS LEVEL 2

310          312

USER C      USER D

314 DATABASE OF REQUESTS

| | |
|---|---|
| Req. 1; 7/1: Access Level - 2 | Req. 3; 7/3: Access Level - 1 |
| Req. 1; 7/1: Access Level - 2 | Req. 4; 7/3: Access Level - 1 |
| Req. 2; 7/1: Access Level - 2 | Req. 5; 7/4: Access Level - 2 |
| Req. 1; 7/2: Access Level - 2 | Req. 1; 7/4: Access Level - 2 |
| Req. 2; 7/2: Access Level - 2 | Req. 2; 7/5: Access Level - 2 |
| Req. 3; 7/2: Access Level - 1 | Req. 5; 7/8: Access Level - 2 |
| Req. 2; 7/3: Access Level - 2 | Req. 4; 7/8: Access Level - 1 |

400

416 DATABASE OF REQUESTS

Req. 1; 7/1: Access Level - 2     Req. 3; 7/3: Access Level - 1

Req. 1; 7/1: Access Level - 2     Req. 4; 7/3: Access Level - 1

Req. 2; 7/1: Access Level - 2     Req. 5; 7/4: Access Level - 2

Req. 1; 7/2: Access Level - 2     Req. 1; 7/4: Access Level - 2

Req. 2; 7/2: Access Level - 2     Req. 2; 7/5: Access Level - 2

Req. 3; 7/2: Access Level - 1     Req. 5; 7/8: Access Level - 2

Req. 2; 7/3: Access Level - 2     Req. 4; 7/8: Access Level - 1

ADAPTIVE AUTO-GENERATION OF USER PORTAL DISPLAYS IN RESPONSE TO USER PERMISSION ALTERATION

FIELD OF TECHNOLOGY

Aspects of the disclosure relate to auto-generating displays for user portals.

BACKGROUND OF THE DISCLOSURE

A user of a company's online digital platform typically is assigned a user permission level. Each user permission level available for a company employee may be associated with varying tasks, user permissions and capabilities.

When a user of a digital platform has a user permission status that has been recently updated, the user may now be faced with unfamiliar tasks or responsibilities. Additionally, features of the digital platform that are displayed to the user after login may have changed.

It would be desirable, therefore, to provide systems and methods to customize a user portal to assist onboarding the user to his new role in the company.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DISCLOSURE

Figure 3:
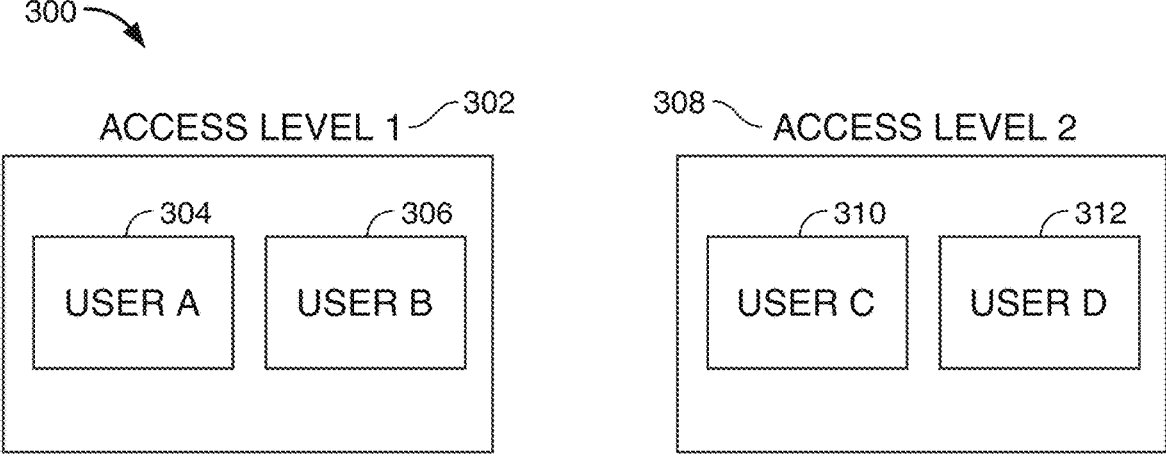

FIG. 2 shows an illustrative flow chart in accordance with principles of the FIG. 3 shows an illustrative diagram in accordance with principles of the disclosure.

Figure 4:
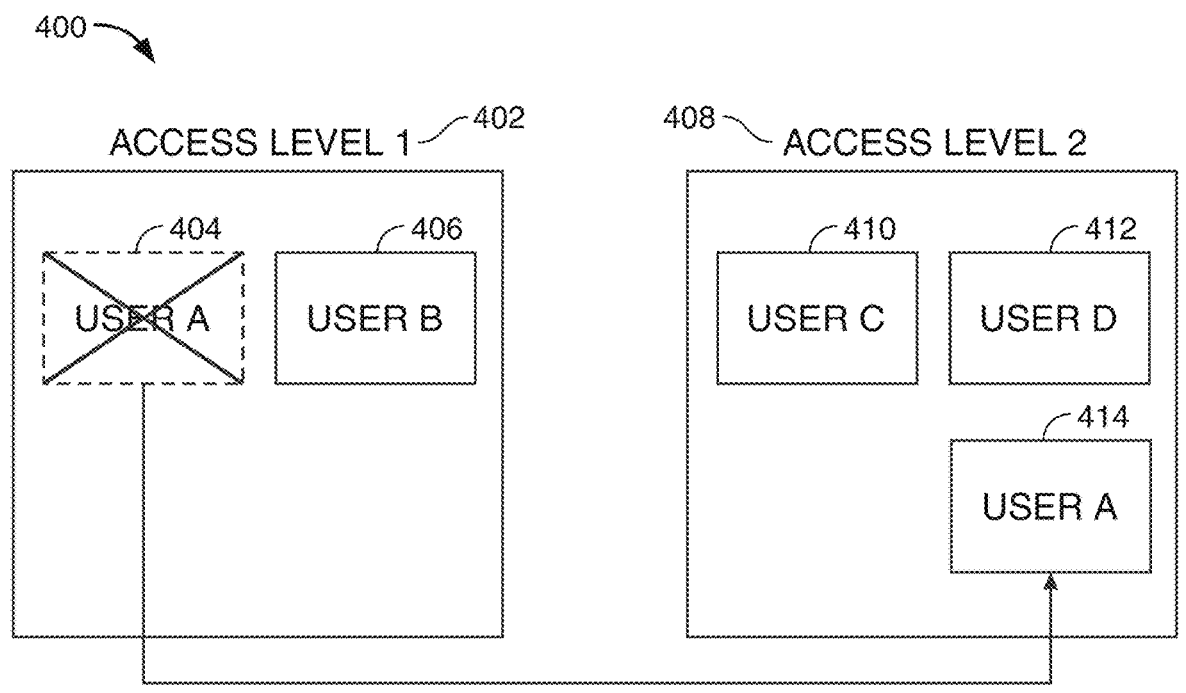

FIG. 4 shows an illustrative diagram in accordance with principles of the disclosure.

Figure 5:
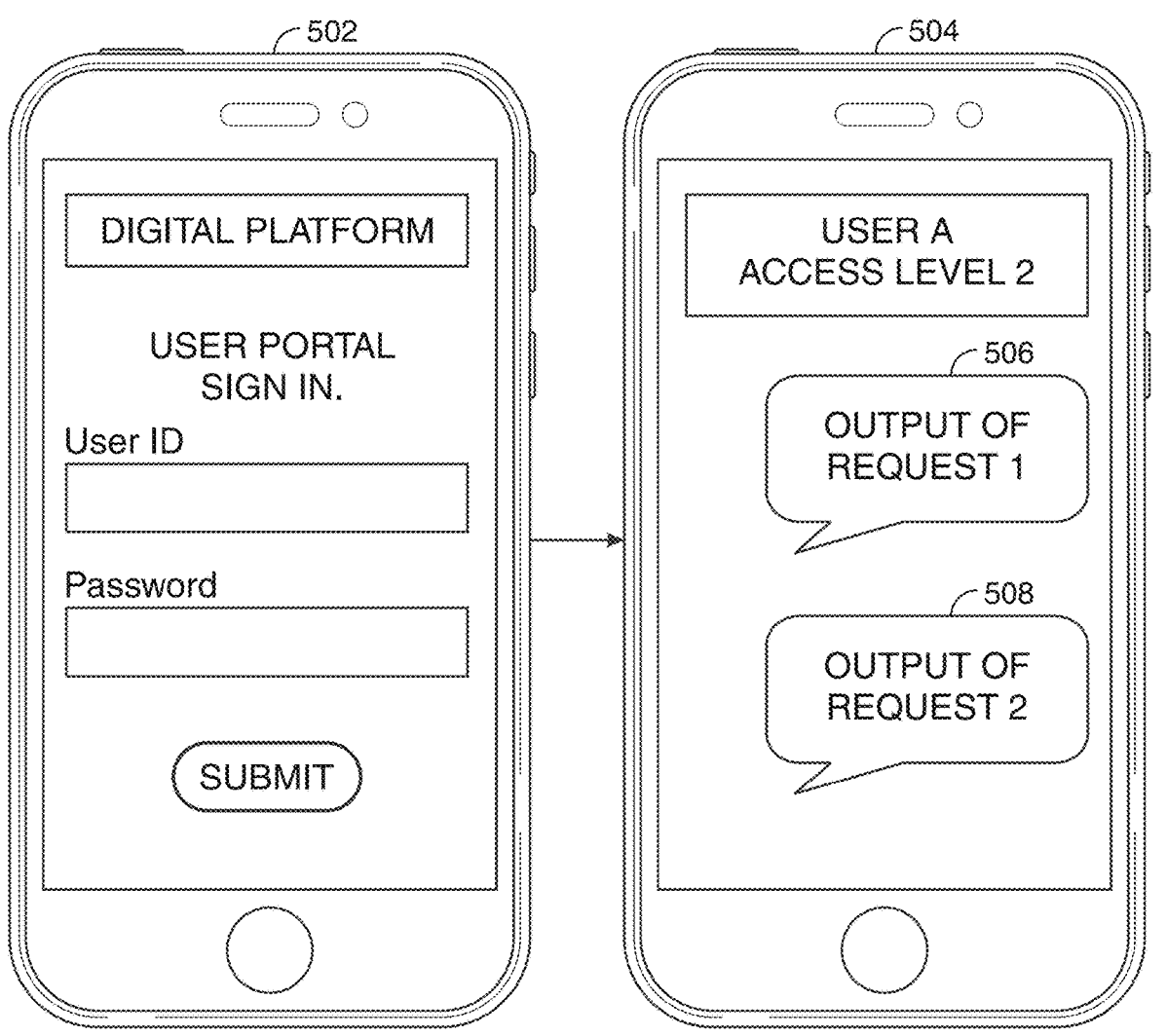

FIG. 5 shows an illustrative diagram in accordance with principles of the disclosure.

Figure 6:
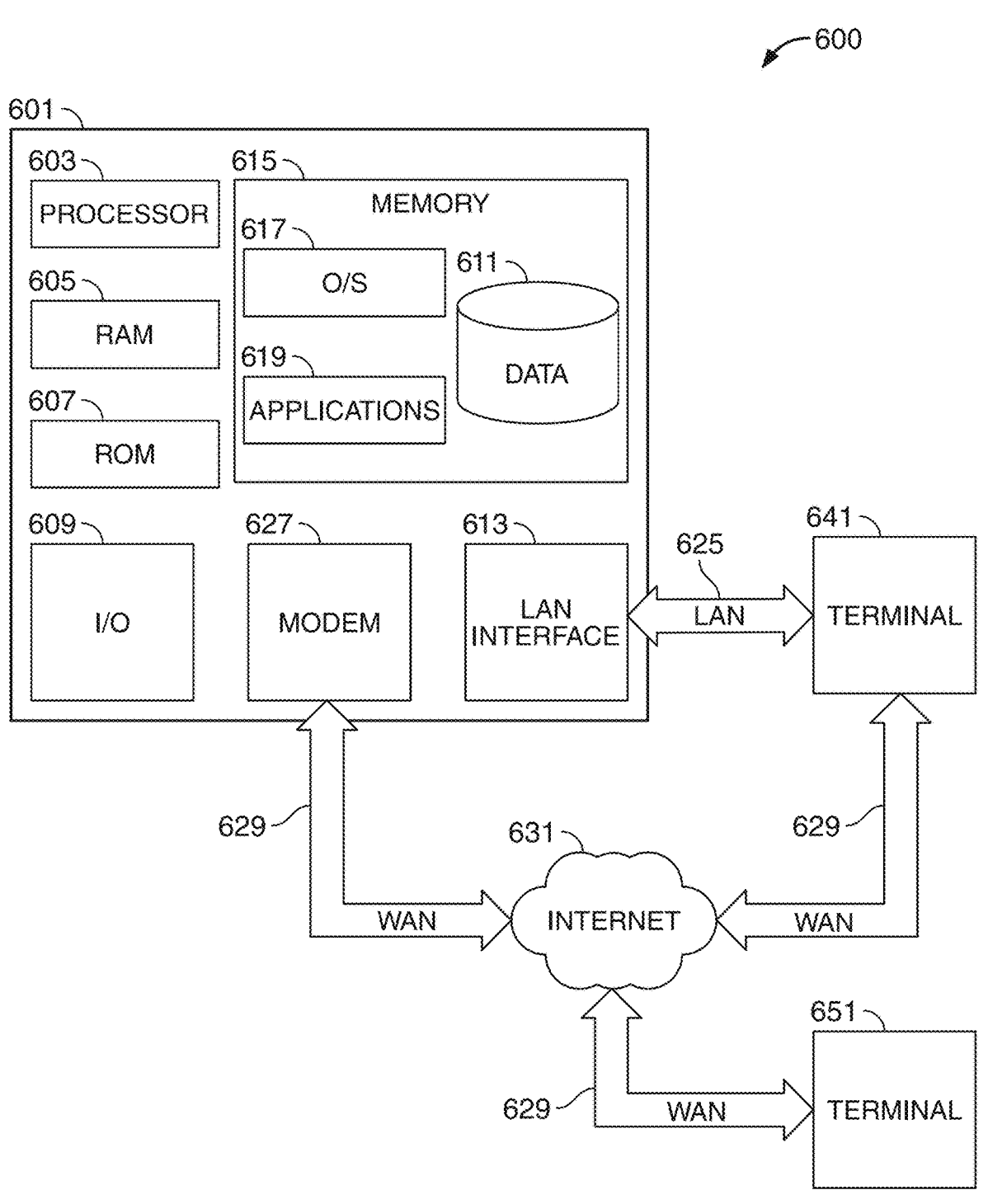

FIG. 6 shows an illustrative block diagram in accordance with principles of the

DISCLOSURE

Figure 7:
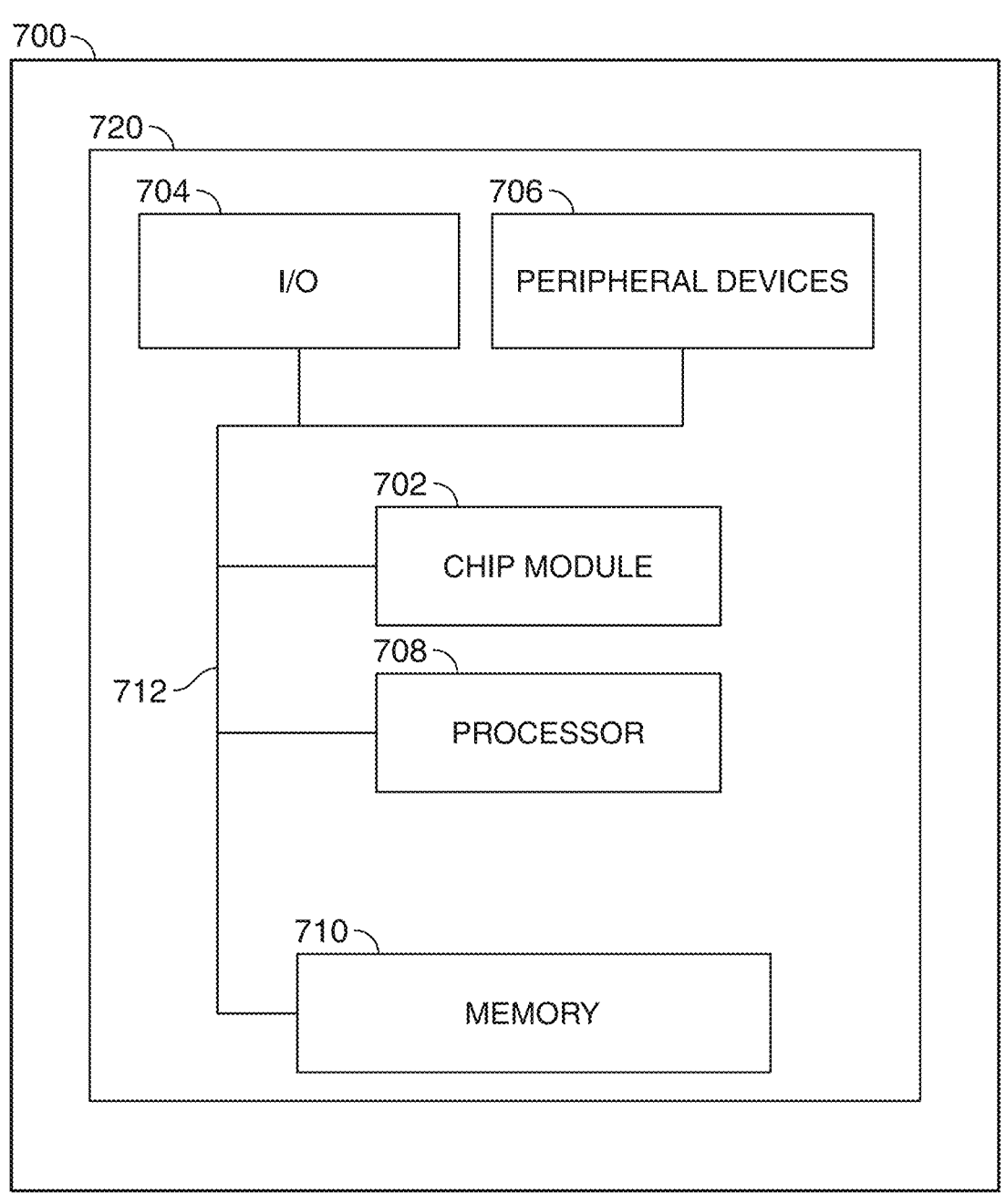

FIG. 7 shows an illustrative apparatus that may be configured in accordance with principles of the disclosure.

DETAILED DESCRIPTION OF THE DISCLOSURE

A method for using an application programming interface ("API") at a digital platform to adaptively autogenerate a set of requests is provided. The method may use the API to push an output of the set of requests to a user portal. The set of requests may be based on a user access level associated with the digital platform. The digital platform may operate on a server of the digital platform. The digital platform may provide a user portal.

The method may include interacting with a digital platform. The digital platform may be the digital platform of an organization. When the organization is a financial organization, the digital platform may be a financial platform that offers one or more financial services such as online banking, checking account balances, etc. The digital platform may include a software system. The software system may allow users to perform operations online. The digital platform may support a user portal.

The digital platform may receive requests from users on the platform via the user portal. When the organization is a financial organization, the requests may be associated with financial transactions, payments, data analysis, organizational activities performed, and any other suitable information. The digital platform may, in response to receiving a request, output a response. The response may include one or more of a display including requested information, a report, a downloadable PDF, a link, or any other suitable data.

A user who is logged onto the digital platform may use a user portal. The user's mobile device may display the data on a user interface ("UI") of the device from the user's portal. The user may have different levels of access to the digital platform based on their security clearance and entitlement granted by the organization. Before the digital platform grants the user's request, the digital platform may confirm that the user is entitled to access the information that would be provided when granting the request. The user may use a computing device to log onto the digital platform through the user portal.

The different levels of access may include full access, partial access, view-only access or any other suitable access level. Some levels of access may enable the user to access data and make changes to the data. Additionally, the different levels of access may further include controls executed prior to enabling access to the document. These controls may include multifactor authentication, user time-out, and transaction amount limits.

The digital platform may include a database associated with the digital platform. The method may include, at the database, obtaining requests executed on the digital platform from each user portal. The user portal may be included in a plurality of user portals.

At the database, the method may further include tagging each request with a user access level and a timestamp associated with the request. Each request may further be tagged with a username and a type of request.

The method may further include, at a processor associated with the digital platform, determining a change in an access level for a user. The change may be from a first user access level to a second user access level. Each user of the digital platform may be assigned a user access level upon an initial login to the digital platform. The user may be re-assigned access levels based on a change in user roles in the organization, a change in security protection level or any other suitable change.

The change may be executed automatically by the server after a pre-determined amount of time the user is active on the digital platform. The change may be triggered by an administrative user of the system. The administrative user may perform a manual change within the digital platform to change the user's level of access. Following the manual change within the platform, the first instruction may be triggered to be transmitted for performing the changes to the user's access level.

In response to the determining of the change, the method may further include, at the processor, autogenerating the set of requests. The autogenerating may include generating a set of requests from the database. Each request in the set of requests may be associated with the second user access level. Each request may also include the timestamp being within a predetermined time range.

The predetermined time range may include requests executed within thirty days prior to the determining of the change. The predetermined time range may include requests executed within 7 days or any other suitable number of days prior to determining the change.

Every time a user transmits a request via the user portal, the request may be stored at the database. The database may store each request, and the user access level associated with the request. The requests may be compiled into a batch file including all requests with the same user access level. The batch file may be filtered and condensed to include only requests with a specific range of timestamps and with a predetermined request frequency.

The method may further include, at the processor, determining a request frequency for each request in the set of requests. The request frequency associated with a request may be a number of times the request has been executed.

The method may further include, at the processor, generating a subset of requests. The subset of requests may be requests from the set of requests that include a request frequency that exceeds a predetermined request frequency. The predetermined request frequency may be two times, three times, four or more times, or any other suitable predetermined request frequency.

The subset of requests may include the most frequently executed requests during a time range for users having a specific user access level. For example, users with the specific access level may be determined, during the time range, to be most likely to request a report of all transactions executed within the past 7 days and to request a report daily of all invoices due that day. As such, these requests may be included in the subset of requests.

The method may further include, at the processor, re-executing the requests in the subset of requests at predetermined time intervals. Following the re-executing, the method may include storing an output in a temporary cache. The output may be the response to the request. The response may include outputting a customized report available for download. The response may include outputting transaction history within a predetermined time period. The response may include a link for additional data associated with the request.

The method may include following each re-execution, at the processor, overwriting a previous output from re-executing the subset of requests. The overwriting may enable maintaining a most updated set of requests that are being requested by users with the same user access level.

In response to a login at the user portal, the method may include interfacing, at the API, with the digital platform and automatically pushing the output in the temporary cache to the user portal.

The output may be displayed on a user interface of the user's mobile device associated with the user portal. The output may be displayed as a pop-up. The output may be displayed as a message in an email, notification display or any other suitable display. In some embodiments, the output may be pushed to the user portal and displayed upon login. In some embodiments, the output may be pushed to the user portal at a specific time of day based on the time of day the request is most commonly requested.

The API may push a bulk download of the output to the user portal from the server of the digital platform. The bulk download may be accessible from the user portal when the user logs onto the portal. An API push may allow the action of the server of the digital platform to be decoupled from the user being logged onto the user portal. The API push may have an advantage in that it provides reliable delivery to the user portal. The API push may send the bulk download encrypted to the user portal.

It should be appreciated that, initially, following the identifying of the change in the user access level, the user may access the outputs pushed to the user portal. After a lapse of time, the user may execute requests and retrieve data that may not be associated with the outputs provided in the user portal. The digital platform may be enabled to learn the behaviors of the user and further customize the data being pushed to the user portal.

In some embodiments the login may be a first login and the set of requests may be a first set of requests. In this embodiments, the method may further include autogenerating, after the first login, a second set of requests. The second set of requests may include requests executed by the user during, and subsequent to, the first login.

The second set of requests may further include the request frequency that exceeds an individual predetermined request frequency. The individual predetermined request frequency may be an individualized frequency for each user. The individualized frequency may be self-calibrating based on the users actions and behaviors over a predetermined time period.

The method may further include, in response to a second login at the user portal, automatically pushing the output from the first set of requests and an output from the second set of requests to the user portal. It should be appreciated that the second login may be after the first login.

Following the second login at the user portal, the method may include using the requests executed by the user for generating the first set of requests.

The method may further include following a lapse of a predetermined time period, maintaining only the autogenerating of the second set of requests. The method may further include, following the lapse of the predetermined time period, terminating the autogenerating of the first set of requests.

The method may include storing user customization options input by the user following the first login. The method may further include, during the subsequent login of the user into the user portal, accessing stored user customization options. The method may further include automatically displaying the output of the subset of requests within the user portal together with the stored user customization options. Customization options may include data associated with the user that may be stored in a user profile. Additional customization options may include outputting a report or document in a format requested previously by the user.

The lapse may be an ample amount of time for the platform to learn the behaviors of the user including the most applicable and common data and documents accessed by the user. The platform may build a profile of historically performed requests executed by the user between the time of the identifying of the change and the lapse of the second pre-determined time period in order to be able to output to the user the most accurate dataset of outputs.

A method for using an API interface at a digital platform to adaptively autogenerate a set of requests and push an output to a user portal is provided. The set of requests may be autogenerated for a new user of the digital platform. The method may autogenerate the set of requests and output it to the user portal upon an initial login to the user portal.

At a database associated with the digital platform the method may include obtaining requests executed on the digital platform from each of a plurality of user portals. The method may further include tagging each request with a user access level and a timestamp associated with the request.

At a processor associated with the digital platform, the method may include receiving a request to generate a user portal for a new user of the digital platform. The new user may access the digital platform to request a generating of a new user portal for the user.

The method may include, at the processor, receiving a user access level for the new user. In response to the receiving, the method may include autogenerating for the user portal a set of requests associated with the user access level and that may include a timestamp within a predetermined time range.

The method may further include, at the processor, extracting from the database requests executed by user portals associated with the user-access level. The method may include determining a request frequency for each request in the set of requests. The method may further include generating a subset of requests that may include a request frequency that exceeds a predetermined request frequency.

The method may further include, at the processor, re-executing the requests in the subset of requests at predetermined intervals and storing an output in a temporary cache.

The method may further include, at the processor, overwriting a previous output from re-executing the subset of requests following each re-execution.

At the API, the method may include interfacing with the digital platform. In response to an initial login at the user portal, the method may include, automatically pushing, via the API, the output in the temporary cache to the user portal.

A system for using an API at a digital platform to adaptively autogenerate a set of requests and push an output to a user portal is provided. The system may include a database associated with the digital platform. The database may be configured to obtain requests executed on the digital platform from each of a plurality of user portals. The database may also be configured to tag each request with a user access level and a timestamp associated with the request.

The system may include a processor associated with the digital platform. The processor may be configured to determine a change in an access level for a user. The change may be from a first user access level to a second user access level.

In response to the determining, the processor may be configured to autogenerate the set of requests. The autogenerating may include generating a set of requests from the database. Each request in the set of requests may be associated with the second user access level Each request may include a timestamp within a predetermined time range.

The autogenerating may also include determining a request frequency for each request in the set of requests. The autogenerating may further include generating a subset of requests. The subset of requests may include requests from the set of requests that exceeds a predetermined request frequency.

The autogenerating may further include re-executing the requests in the subset of requests at predetermined intervals and storing an output in a temporary cache.

The autogenerating may further include overwriting a previous output from re-executing the subset of requests following each re-execution. The system may further include the API. The API may interface with the digital platform. The API may be configured to, in response to a login at the user portal, automatically push the output in the temporary cache to the user portal.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
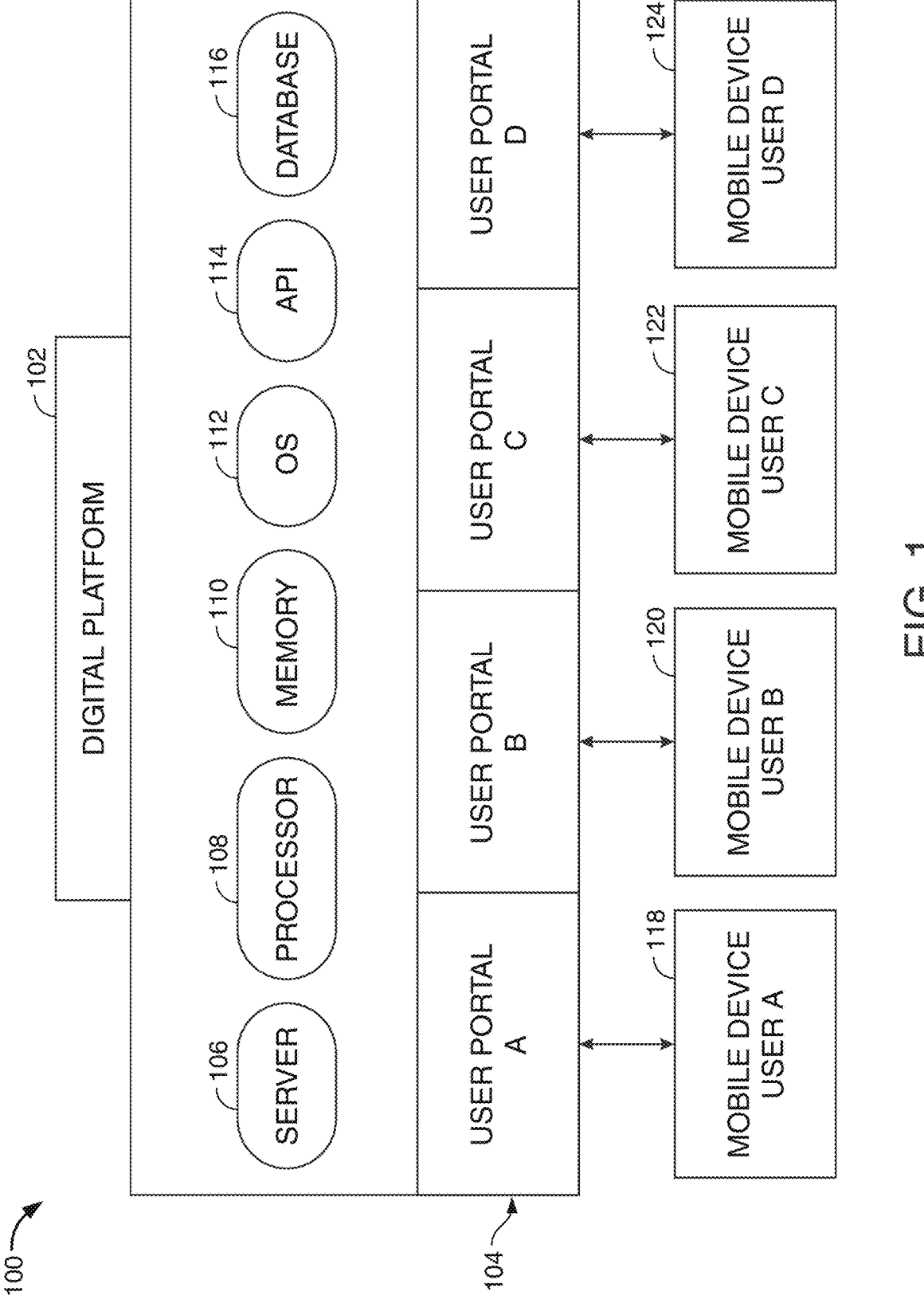
FIG. 1 shows an illustrative diagram in accordance with principles of the disclosure.

FIG. 1 shows an illustrative diagram of a digital platform 100. Digital platform 100 may be a system. Digital platform 100 may be associated with an organization. Employees and clients of the organization may be enabled to access data and perform transactions from a user's mobile device.

Users of the digital platform may use the user's computing device to access the digital platform. Computing devices 118, 120, 122 and 124 may include a desktop computer, a portable version of a desktop computer such as a laptop computer, a mobile device such as a smartphone, a portable device with a touchscreen that may need internet to be fully functional such as a tablet, or any other computing device with internet connectivity.

Each user of each of mobile devices 118-124 may be enabled to log into digital platform 102 using user portals 104. Digital platform 102 may include a server 106, a processor 108, memory 110, an operating system 112, an API 114, a database 116, middleware, and/or other digital platform components. Each request executed may be stored at database 116.

Digital platform 102 may use user portals 104 as a conduit to communicate with user devices such as computing device 118-124.

User portals 104 may include a user portal associated with user 'A', a user portal associated with user 'B', a user portal associated with user 'C' and a user portal associated with user 'D'. User portals 104 may be part of digital platform 102. User portals 104 may be separate from digital platform 102. As illustrated, user portals 104 may be part of digital platform 102.

Requests that are executed from each of user portals 104 may be included in enabling the autogenerating of the set of requests for a user following a change in an access level.

FIG. 2 shows an illustrative flowchart 200 in accordance with principles of the disclosure. Flowchart 200 shows a method for using the API to adaptively autogenerate a set of requests and push an output to a user portal.

At step 202 the method may include, using the database, obtaining requests executed on the digital platform from each of a plurality of user portals.

At step 204, the method may include, using the database, tagging each request with a user access level and a timestamp associated with each request.

At step 206, the method may include, using the processor, determining a change in an access level for a user. The change may be from a first user access level to a second user access level.

In response to the determining, the method may include, at step 208, autogenerating the set of requests. The autogenerating may include, as shown at 210, generating a set of requests from the database that may include a timestamp being within a predetermined time range.

At step 212, the method may include determining a request frequency for each request. The method may further include, at step 214, generating a subset of requests that may include a request frequency that exceeds a predetermined request frequency.

At step 216, the method may include re-executing the requests in the subset of requests at predetermined intervals. The method may further include storing an output of the requests in a temporary cache. The re-executing may enable maintaining a most updated set of requests that have been executed most frequently and most recently.

At step 218, the method may include, following each re-execution, overwriting a previous output from the re-executing of the subset of requests.

At step 220, the method may include, in response to a login at the user portal, automatically pushing the output in the temporary cache to the user portal, via the API.

FIG. 3 shows an exemplary diagram 300 that may include two access levels within the digital platform. In some embodiments, the digital platform may include three, four, five or any other suitable number of access levels. Each access level may include a plurality of users. Additionally, exemplary diagram 300 shows a database of requests executed at the digital platform from the plurality of user portals.

User A, shown at 304, and user B, shown at 306, may have a first level access 302. Access level one shown at 302 may entitle the user to a first level of permissions for accessing and requesting data within the digital platform.

User C, shown at 310, and user D, shown at 312, may have a second level access 308. Access level two, shown at 308, may entitle the user to a second level of permissions for accessing and requesting data within the digital platform.

Database of requests 314 may be an exemplary table including a plurality of requests executed by each of the users. Each request includes a timestamp and a user access level. The user access level may be the level of access associated with the user that executed the request. The timestamp displayed for each request may include the day of the month the request is executed. The time of day may not be illustrated in the diagram but may also be included in the timestamp.

For example, request 1, as shown in the diagram, may be requested 4 times. The request may be executed by the same user. The request may be executed by different users. Request one may be executed by users with a second level of access.

FIG. 4 shows another exemplary diagram 400. Exemplary diagram 400 may show a change in a level of access of user A. Entitlements associated with user A, at 404, may be changed. User A may start at access level one, shown at 402. User A may be shown at 404. Following the change to access level two at 408, user A may be shown at 414.

In response to the identifying of the change, the system may analyze the database of requests 416 to determine requests associated with access level two that may be most frequently requested by other users of the digital platform. An autogenerating of the set of requests may be executed at the database 416. The selected requests shown in the database of requests 416, may be the subset of requests that include a second user access level, executed within a predetermined time range and include a request frequency that exceeds the predetermined request frequency.

Database of requests 416 may determine requests one and requests two to be most frequently requested by users with a second access level.

Request one and request two may be executed and an output of each of request one and request two may be stored in a temporary cache pending user A login to the user's portal. At predetermined intervals, requests one and two may be re-executed. The output of each request, following re-execution, may overwrite the previous output stored at the temporary cache.

FIG. 5 shows an exemplary diagram of a mobile device associated with user A. Mobile device 502 may display a UI. The UI may display data from the digital platform. The UI may display data from the user's user portal.

At 502, user A may login to the user portal for a first time following the change in access level. Following authentication of login at 502, the user may be enabled to access the user portal, as shown at 504. Upon login, the outputs may be retrieved from the temporary cache and automatically displayed to the user. At 504, following the autogenerating, an output of request 1, shown at 506 and an output of request 2, shown at 508 may be displayed to the user. The output may be based on results from the autogenerating of the set of requests from the database of requests shown at 416. The output may be a downloadable PDF, a hyperlink, a file or any other suitable output.

FIG. 6 shows an illustrative block diagram of system 600 that includes computer 601. Computer 301 may alternatively be referred to herein as an "engine," "server" or a "computing device." The computing system may include one or more computer servers 601. Computer 601 may be any computing device described herein, such as the digital platform, one or more mobile devices, one or more servers that the digital platform may be operating on, and any other suitable devices in accordance with the disclosure. Elements of system 600, including computer 601, may be used to implement various aspects of the systems and methods disclosed herein.

Computer 601 may have a processor 603 for controlling the operation of the device and its associated components, and may include RAM 605, ROM 607, input/output circuit 609, and a non-transitory or non-volatile memory 615. Machine-readable memory may be configured to store information in machine-readable data structures. Other components commonly used for computers, such as EEPROM or Flash memory or any other suitable components, may also be part of the computer 601.

The memory 615 may be comprised of any suitable permanent storage technology e.g., a hard drive. The memory 615 may store software including the operating system 617 and application(s) 619 along with any data 611 needed for the operation of computer 601. Memory 615 may also store videos, text, and/or audio assistance files. The data stored in Memory 615 may also be stored in cache memory, or any other suitable memory. Memory 615 may store the output of the subset of requests following each re-execution of the subset of requests.

Input/output ("I/O") module 609 may include connectivity to a microphone, keyboard, touch screen, mouse, and/or stylus through which input may be provided into computer 601. The input may include input relating to cursor movement. The input/output module may also include one or more speakers for providing audio output and a video display device for providing textual, audio, audiovisual, and/or graphical output. The input and output may be related to computer application functionality.

Computer 601 may be connected to other systems via a local area network (LAN) interface 613. Computer 601 may operate in a networked environment supporting connections to one or more remote computers, such as terminals 641 and 651. Terminals 641 and 651 may be personal computers or servers that include many or all of the elements described above relative to computer 601.

When used in a LAN networking environment, computer 601 is connected to LAN 625 through a LAN interface 613 or an adapter. When used in a WAN networking environment, computer 601 may include a modem 627 or other means for establishing communications over WAN 629, such as Internet 631.

In some embodiments, computer 601 may be connected to one or more other systems via a short-range communication network (not shown). In these embodiments, computer 601 may communicate with one or more other terminals 641 and 651, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 619, which may be used by computer 601, may include computer executable instructions for invoking functionality related to communication, such as e-mail, Short Message Service (SMS), and voice input and speech recognition applications. Application program(s) 619 (which may be alternatively referred to herein as "plugins," "applications," or "apps") may include computer executable instructions for invoking functionality related to performing various tasks. Application programs 619 may utilize one or more algorithms that process received executable instructions, perform power management routines or other suitable tasks. Application programs 619 may include any one or more of the applications, instructions and algorithms associated with and/or embedded within the digital platform, user portals and mobile devices and/or other applications described herein.

Application program(s) 619 may include computer executable instructions (alternatively referred to as "programs"). The computer executable instructions may be embodied in hardware or firmware (not shown). The computer 601 may execute the instructions embodied by the application program(s) 619 to perform various functions.

Application program(s) 619 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 619 may include one or more algorithms that may be used to implement features of the disclosure. Applications 619 may include one or more applications running at the TDU, the SOTAS, the servers of the issuer and/or financial institution and any other application described herein.

The invention may be described in the context of computer-executable instructions, such as applications 619, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 601 and/or terminals 641 and 651 may also include various other components, such as a battery, speaker, and/or antennas (not shown). Components of computer system 601 may be linked by a system bus, wirelessly or by other suitable interconnections. Components of computer system 601 may be present on one or more circuit boards. In some embodiments, the components may be integrated into a single chip. The chip may be silicon-based.

Terminal 651 and/or terminal 641 may be portable devices such as a laptop, cell phone, Blackberry™, tablet, smartphone, or any other computing system for receiving, storing, transmitting and/or displaying relevant information. Terminal 651 and/or terminal 641 may be one or more user devices. Terminals 651 and 641 may be identical to computer 601 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

FIG. 7 shows illustrative apparatus 700 that may be configured in accordance with the principles of the disclosure. Apparatus 700 may be a computing device. Apparatus 700 may include chip module 702, which may include one or more integrated circuits, and which may include logic configured to perform any other suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may compute data structural information and structural parameters of the data; and machine-readable memory 710.

Machine-readable memory 710 may be configured to store in machine-readable data structures: machine executable instructions, (which may be alternatively referred to herein as "computer instructions" or "computer code"), applications such as applications 719, signals, and/or any other suitable information or data structures.

Components 702, 704, 706, 708 and 710 may be coupled together by a system bus or other interconnections 712 and may be present on one or more circuit boards such as circuit board 720. In some embodiments, the components may be integrated into a single chip. The chip may be silicon-based.

Thus, systems and methods for using an API at a digital platform to adaptively autogenerate a set of requests and push an output to a user portal is provided. Persons skilled in the art will appreciate that the present invention can be practiced by other than the described embodiments, which are presented for purposes of illustration rather than of limitation.

What is claimed is:

1. A method for using an application programming interface ("API") at a digital platform to adaptively autogenerate a set of requests and push an output to a user portal, the set of requests based on a user access level associated with the digital platform, the digital platform operating on a server of the digital platform, the method comprising:

at a database associated with the digital platform:

obtaining requests executed on the digital platform from each of a plurality of user portals; and tagging each request of the obtained requests with a user access level and a timestamp associated with the request;

at a processor associated with the digital platform:

determining a change in an access level for a user, the change being from a first user access level to a second user access level, and the second user access level grants different permissions to users from the first user access level; and in response to the determining of the change, autogenerating the set of requests by:

generating the set of requests from the database, each request in the set of requests is determined based on the second user access level and each request in the set of requests comprises a timestamp being within a predetermined time range;

determining a request frequency for each request in the set of requests;

generating, from the set of requests, a subset of requests comprising the request frequency that exceeds a predetermined request frequency;

re-executing each request in the subset of requests at predetermined intervals and storing an output of the request in the subset of requests in a temporary cache; and overwriting at the temporary cache, a previous output from re-executing the subset of requests following each re-execution; and at the API interfacing with the digital platform, in response to a login at the user portal by the user, automatically pushing the output in the temporary cache to the user portal for display to the user.

2. The method of claim 1, when the login is a first login and the set of requests is a first set of requests, further comprising autogenerating, after the first login, a second set of requests, the second set of requests comprising requests executed by the user during, and subsequent to, the first login.

3. The method of claim 2, wherein the second set of requests further comprises the request frequency that exceeds an individual predetermined request frequency.

4. The method of claim 3, wherein, in response to a second login at the user portal, the second login being after the first login, automatically pushing the output from the first set of requests and an output from the second set of requests to the user portal.

5. The method of claim 4, further comprising, following a lapse of a predetermined time period, maintaining only the autogenerating of the second set of requests for the user.

6. The method of claim 5, further comprising terminating the autogenerating of the first set of requests for the user.

7. The method of claim 4, further comprising:

storing user customization options input by the user following the first login;

during a subsequent login of the user into the user portal, access stored user customization options; and automatically displaying the output of the subset of requests within the user portal together with the stored user customization options.

8. The method of claim 1, wherein the set of requests include one or more of a request to generate a report, a request for a document and a request to access a portion of secure data.

9. The method of claim 1, wherein the set of requests executed during the predetermined time range comprises requests executed within 30 days prior to the change.

10. The method of claim 1, wherein the set of requests executed during the predetermined time range comprises requests executed within 7 days prior to the change.

11. The method of claim 1, wherein the predetermined request frequency includes requests received more than three times within the predetermined time range.

12. The method of claim 1, wherein the digital platform comprises a software system that allows users to perform operations online using a computing device.

13. A method for using an application programming interface ("API") at a digital platform to adaptively autogenerate a set of requests and push an output to a user portal, the set of requests based on a user access level associated with the digital platform, the digital platform operating on a server of the digital platform, the method comprising:

at a database associated with the digital platform:

obtaining requests executed on the digital platform from each of a plurality of user portals; and tagging each request of the obtained requests with a user access level and a timestamp associated with the request;

at a processor associated with the digital platform:

receiving a request to generate the user portal for a new user of the digital platform;

receiving a user access level for the new user, the user access level being a first user access level different from a second user access level, and the first user access level grants different permissions to users from the second user access level;

in response to the receiving, autogenerating for the user portal the set of requests, each request in the set of requests is determined based on the user access level and comprises a timestamp being within a predetermined time range;

extracting from the database, requests executed by user portals based on the user access level;

determining a request frequency for each request in the set of requests;

generating, from the set of requests, a subset of requests comprising the request frequency that exceeds a predetermined request frequency;

re-executing each request in the subset of requests at predetermined intervals and storing an output of the request in the subset of requests in a temporary cache; and overwriting, at the temporary cache, a previous output from re-executing the subset of requests following each re-execution; and at the API interfacing with the digital platform, in response to an initial login at the user portal by the new user:

automatically pushing the output in the temporary cache to the user portal; and displaying the output in a user interface ("UI") of the user portal to the new user.

14. The method of claim 13, when the set of requests is a first set of requests, further comprising autogenerating, after the initial login, a second set of requests, the second set of requests comprising requests executed by the new user during, and subsequent to the initial login.

15. The method of claim 14, wherein the second set of requests further comprises the request frequency that exceeds the predetermined request frequency.

16. The method of claim 15, wherein, in response to a second login at the user portal, the second login being after the initial login, automatically pushing the output from the first set of requests and an output from the second set of requests to the user portal.

17. The method of claim 16, further comprising, following a lapse of a predetermined time period, terminating the autogenerating of the first set of requests and maintaining the autogenerating of the second set of requests.

18. The method of claim 13, wherein the digital platform comprises a software system that allows users to perform operations online using a computing device.

19. A system for using an application programming interface ("API") at a digital platform to adaptively autogenerate a set of requests and push an output to a user portal, the set of requests based on a user access level associated with the digital platform, the digital platform operating on a server of the digital platform, the system comprising:

a database associated with the digital platform, the database configured to:

obtain requests executed on the digital platform from each of a plurality of user portals; and tag each request of the obtained requests with a user access level and a timestamp associated with the request;

a hardware processor associated with the digital platform, the processor configured to:

determine a change in an access level for a user, the change being from a first user access level to a second user access level, and the second user access level grants different permissions to users from the first user access level; and in response to the determining of the change, autogenerate the set of requests by:

generating a set of requests from the database, each request in the set of requests is determined based on the second user access level and each request in the set of requests comprising a timestamp in a predetermined range of timestamps;

determining a request frequency for each request in the set of requests;

generating, from the set of requests, a subset of requests comprising the request frequency that exceeds a predetermined request frequency;

re-executing each request in the subset of requests at predetermined intervals and storing an output of the request in the subset of requests in a temporary cache; and overwriting at the temporary cache, a previous output from re-executing the subset of requests following each re-execution; and the API interfacing with the digital platform, the API configured to:

in response to a login at the user portal by the user, automatically push the output in the temporary cache to the user portal for display to the user.

20. The system of claim 19, when the login is a first login and the set of requests is a first set of requests, wherein the processor is further configured to:

autogenerate, after the first login, a second set of requests, the second set of requests comprising requests executed by the user during, and subsequent to, the first login; and in response to a second login at the user portal, the second login being after the first login, automatically push the output from the first set of requests and an output from the second set of requests to the user portal.

* * * * *